United States Patent Office 3,830,837
Patented Aug. 20, 1974

3,830,837
ANTIBIOTIC SUBSTANCES
Giancarlo Lancini, 4, Via Vittadini, Pavia, and Ettore Lazzari, 10, Via Delle Camelie, and Alberto Diena, 49, Via Jenner, Milan, Italy
No Drawing. Continuation-in-part of application Ser. No. 559,749, June 23, 1966. This application Sept. 14, 1972, Ser. No. 289,118
Int. Cl. C07c 135/00
U.S. Cl. 260—534                                 1 Claim

ABSTRACT OF THE DISCLOSURE

A process for preparing α-amino-ω-N-nitrosohydroxylamino acids is described.

---

This application is a continuation-in-part of our copending application Ser. No. 559,749 filed June 23, 1966.

This invention is concerned with new insect sterilant compositions, and the manufacture of the substances which are the active ingredients of these compositions.

More particularly, this invention relates to compositions containing as active ingredients compounds which are represented by the following general formula:

$$H_2N-\underset{R}{\underset{|}{C}}-\underset{R'}{\underset{|}{C}}-CH-(CH_2)_n-\underset{NO}{\underset{|}{N}}-OH$$
$$\underset{}{\overset{COOH}{|}}$$

wherein R and R' represent hydrogen or a lower alkyl group of 1–8 carbon atoms inclusive and $n$ represents zero or an integer from 1 to 8 inclusive.

This invention provides also a method of preparing new and useful substances represented by the above general formula in which $n$ represents an integer from 1 to 8.

It will be appreciated by those skilled in the art that the substances of the above formula, being alpha-amino acids, may exist both in racemic and optically active forms. This application is directed to all possible stereoisomeric forms of the substances.

The new chemical process is in accordance with the following reaction scheme:

$$X-\underset{R'}{\underset{|}{C}H}-(CH_2)_n\text{-halogen} \longrightarrow X-\underset{R'}{\underset{|}{C}H}-(CH_2)_n-NHOH \longrightarrow$$
$$\text{I} \qquad\qquad\qquad \text{II}$$

$$H_2N-\underset{R}{\underset{|}{C}}-\underset{R'}{\underset{|}{C}H}-(CH_2)_n-NHOH \longrightarrow$$
$$\overset{COOH}{|}$$
$$\text{III}$$

$$H_2N-\underset{R}{\underset{|}{C}}-\underset{R'}{\underset{|}{C}}-(CH_2)_n-\underset{NO}{\underset{|}{N}}-OH$$
$$\overset{COOH}{|}$$
$$\text{IV}$$

In the above formulas R, R' and $n$ are as defined above and X represents one of the following groups:

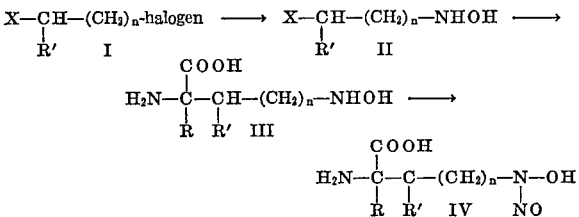

wherein R is as defined above.

According to the process a mixture of a halogenated hydantoin or acylamidoester of Formula I with at least 2 equivalent molecular amounts of anhydrous hydroxylamine is allowed to react for 0.5 to 5 hours, at a temperature between about 40° C. and the melting point of the mixture. After cooling, concentrated hydrochloric acid is added and the mixture is heated at 90°–120° C. for 0.5–12 hours.

After evaporation to dryness the residue is dissolved in water and adjusted to about neutral pH. After addition of a water miscible solvent in which the hydroxylamino compound is insoluble, this precipitates out. This compound (Formula III) is dissolved in an aqueous solution containing an equimolecular amount of an acid and then treated with an equivalent amount of an alkali metal nitrite at a temperature between about −10° C. and 5° C. Nitrosohydroxylamino acids are thus obtained with high yields while the aminic moiety is unexpectedly not attacked.

It will be apparent that the process of the present invention allows a comparatively simple way for the chemical preparation of the antibiotic alanosine, i.e. L-2-amino-3-nitrosohydroxylamino-propionic acid. The preparation by fermentation of Str. alanosinicus n. sp. ATCC 15710 is described in our copending application Ser. No. 470,884, filed July 9, 1965 now Pat. No. 3,676,490. The present application relates therefore to the first chemical synthesis of alanosine.

The compounds of this invention show a very high degree of activity as insect reproduction inhibitors. For instance, the racemic and the optically active forms of 2 - amino-3-nitrosohydroxylamino-propionic, 2-amino-3-nitrosohydroxylamino-butyric acid and 2-amino-4-nitrosohydroxylaminobutyric acid when added to a diet for house fly larvae at a concentration lower than 1000 parts per million, caused complete inhibition of the reproductive ability of the flies.

A suitable diet for house fly may have the following composition:

| | Parts by weight |
|---|---|
| Powdered skim milk | 46 |
| Powdered sugar | 46 |
| Powdered whole egg | 8 |

The mutual ratio of the components may obviously be varied within a considerably wide range. The diet mixtures are treated with amounts varying from 1000 to 100 parts per million of the active sterilants.

In representative experiments about 100 pupae of the house fly were placed in a screen fly cage. The flies which emerged in less than one day as a mixed population of males and females were supplied with water and treated diet. Three or four days after emergence from the pupa stage, an egg laying medium which is not eaten by the adults was placed in the cage with the flies. After three days, the rearing medium was removed for examination of eggs or larvae and immersed in lukewarm water which forced the emerged larva upwards out of the top of the medium in an attempt to escape drowning. Thus, the larvae or not fertile eggs were counted. In the control cages where the flies were supplied with untreated diet the usual number of larvae found amounted to several thousands while in the cages where treated diet had been introduced the number of larvae was reduced to about 5 percent.

The following non-limitative examples illustrate the preparation of the compounds.

EXAMPLE 1

2-Amino-3-nitrosohydroxyaminopropionic acid

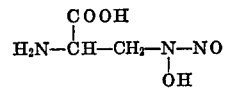

An intimate mixture of 10 g. of methyl 2-acetamido-3-chloropropionate and 20 g. of hydroxylamine is gently heated until fusion is complete; at this point a strong heat evolution occurs and the mass must be externally cooled until heat evolution subsides. After 4 hours at room temperature concentrated hydrochloric acid is cautiously added and the mixture is heated for 2 hours on a boiling water bath. To eliminate excess hydroxylamine, the mixture is evaporated to dryness and the residue is dissolved in a water-acetone mixture adjusted to pH about 5 with sodium acetate. After standing some hours the mixture is extracted with diethyl ether, the aqueous layer is evaporated to dryness and the residue extracted with methanol. The methanol solution is then evaporated to dryness, the residue is dissolved in water and ammonia is added to alkaline reaction. The precipitate is collected and dried. Yield 4.7 g. (70.3%) of 2-amino-3-hydroxylaminopropionic acid, m.p. 160–161° C. Ethanol addition may speed up the precipitation. Into a solution of 2 g. of 2-amino-3-hydroxylaminopropionic acid in 25 ml. of water and 1 ml. of acetic acid, a solution of 1.15 g. of sodium nitrile in 1 ml. of water is added dropwise at 0° C., followed by 0.5 ml. of acetic acid. The precipitate is collected and dried. Yield 1.8 g. (72.5%) of DL-2-amino-3-nitrosohydroxylamino propionic acid, m.p. about 185° C. (dec.).

The separation of L and D enantiomers is achieved by preparing the dibenzoyl derivative of the racemic 2-amino-3-hydroxylaminopropionic acid and separating the optically active forms as cinchonine salts by crystallization from acetone-ether mixtures. Acid hydrolysis of the resolved dibenzoyl derivative gives the L-2-amino-3-hydroxylaminopropionic acid, and D-2-amino-3-hydroxylaminopropionic acid. Nitrosation of these products affords respectively L-2-amino-3-nitrosohydroxylaminopropionic acid $[\alpha]_D = -46$ (0.1 N NaOH) and D-2-amino-3-nitrosohydroxylaminopropionic acid $[\alpha]_D + 46$ (0.1 N NaOH).

EXAMPLE 2

2-Amino-4-nitrosohydroxylaminotbuyric acid

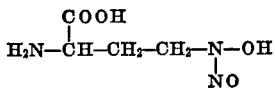

A mixture of 25 g. of 5-(2-bromoethyl)-hydantoin and 15 g. of hydroxylamine is fused and then allowed to stand for 2 hours. A water-acetone mixture is then added, followed by sodium acetate to pH about 5. After some hours the pH is adjusted to about 6.5 with NaOH and the acetone oxime so formed is extracted with diethyl ether. The water solution is made acidic with HCl and concentrated to dryness. The residue is extracted with ethanol, filtered and evaporated to dryness. The residue is dissolved in water, filtered through a column of Dowex 50 W in acid form and eluted with 5 percent aqueous HCl. The fractions of the eluate giving positive reaction with triphenyltetrazole are combined and evaporated to dryness, and the residue is crystallized from ethanol-diethyl ether. Yield 3.4 g. (64%) of 5-(2-hydroxylaminoethyl)-hydantoin hydrochloride, m.p. 155–157° C.

A mixture of 5.2 g. of 5-(2-hydroxylaminomethyl)-hydantoin hydrochloride and 300 ml. of concentrated hydrochloric acid is treated at 120° C. in a closed vessel for 12 hours. After evaporation to dryness the residue is passed through Dowex 50WX4 and eluted with 5 percent HCl.

The fractions giving a positive triphenyltetrazole test are combined and evaporated to dryness and the residue is dissolved in methanol and treated with two equivalent amounts of 5N sodium hydroxide. 2-Amino-4-hydroxylaminobutyric acid precipitates out and is collected and dried. Yield 2.8 g., m.p. 145–147° C. The mono-hydrochloride has m.p. 121–123° C.

A solution of 3.2 g. of the amino acid in 20 ml. of N HCl is treated at about 0° C. with 1.47 g. of solid NaNO₂, added in portions. At the end of the addition 20 ml. of ethanol are added and the precipitate is collected. Yield 3.2 g. (92%) of 2-amino-4-nitrosohydroxylaminobutyric acid, m.p. 183–185° C.

EXAMPLE 3

2-Amino-6-nitrosohydroxylaminohexanoic acid

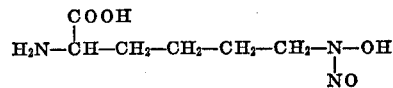

A mixture of 19 g. of 5-(4-bromobutyl)-hydantoin and 60 g. of hydroxylamine is fused as described in the preceding examples, and the excess hydroxylamine is removed as therein indicated through the formation of acetone oxime. Yield 14.6 g. (80.4%) of 5-(4-hydroxylaminobutyl)-hydantoin hydrochloride, m.p. 147–149° C.

A solution of 3 g. of 5-(4-hydroxylaminobutyl)-hydantoin hydrochloride in 250 ml. of concentrated HCl is heated at 120° C. for 12 hours in a closed vessel. By working exactly as described in example 2, a yield of 1.9 g. of 2-amino-6-hydroxylaminohexanoic acid is obtained, m.p. 197–200° C.

A solution of 11.5 g. of the above amino acid in 65 ml. of N HCl is treated with 4.45 g. of solid NaNO₂ added in small portions at $-5°$ C. At the end of the addition 80 ml. of ethanol are added and the precipitate is collected. Yield 8.5 g. (69% g. ) of 2-amino-6-nitrosohydroxylaminohexanoic acid, m.p. 182–183° C.

EXAMPLE 4

By a process analogous to that described in the preceding Examples 2-amino-2-methyl-3-nitrosohydroxylaminopropionic acid is prepared. The formula is:

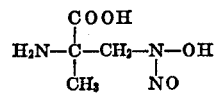

EXAMPLE 5

By a process analogous to that described in the preceding Examples 2 - amino - 3 - nitrosohydroxylaminobutyric acid is prepared. The formula is:

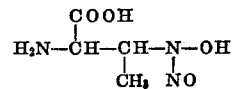

We claim:
1. A process for preparing α-amino-ω-nitrosohydroxylamino acid of the formula

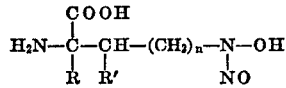

wherein R and R' are members of the class consisting of hydrogen and lower alkyl groups, n is an integer from 0 to 4 inclusive which comprises heating to fusion a mixture of a compound of the formula

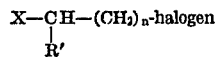

wherein R' and n are as defined above and X is selected from radicals of the formula

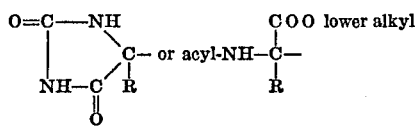

wherein R is as defined above, acyl is a lower carboxylic acid acyl group, and at least 2 equimolecular amounts of anhydrous hydroxylamine, heating the obtained hydroxylamino compound with concentrated hydrochloric acid at 90–120° C. for 0.5–12 hours and treating an aqueous solution of about one molecular amount of the obtained hydroxylamino acid and substantially about one molecular amount of an acid with about one molecular amount of an alkali nitrite at a temperature between about −10° C. and about +5° C.

References Cited

Lancini et al.: IL Farmac Ed Sci., 24 169 (1969).

Weygand et al.: Preparative Organic Chemistry, pp. 461, 577, 8 (1972).

ROBERT GERSTL, Primary Examiner

U.S. Cl. X.R.

260—254, 256.4 R, 482 R